United States Patent
Fukasawa

(10) Patent No.: US 9,377,981 B2
(45) Date of Patent: Jun. 28, 2016

(54) IMAGE FORMING SYSTEM THAT SENDS SCHEDULE INFORMATION OF IMAGE FORMING APPARATUS OVER NETWORK

(71) Applicant: Oki Data Corporation, Tokyo (JP)

(72) Inventor: Ryuji Fukasawa, Tokyo (JP)

(73) Assignee: Oki Data Corporation, Tokyo (JP)

(*) Notice: Subject to any disclaimer, the term of this patent is extended or adjusted under 35 U.S.C. 154(b) by 0 days.

(21) Appl. No.: 14/668,649

(22) Filed: Mar. 25, 2015

(65) Prior Publication Data

US 2015/0277810 A1  Oct. 1, 2015

(30) Foreign Application Priority Data

Mar. 28, 2014 (JP) .................................. 2014-069353

(51) Int. Cl.
*G06F 15/00* (2006.01)
*G06F 3/12* (2006.01)
*G06K 1/00* (2006.01)
*G06K 15/00* (2006.01)

(52) U.S. Cl.
CPC .............. *G06F 3/126* (2013.01); *G06F 3/1204* (2013.01); *G06F 3/1288* (2013.01); *Y02B 60/1271* (2013.01)

(58) Field of Classification Search
USPC .................................................. 358/1.1–1.18
See application file for complete search history.

(56) References Cited

U.S. PATENT DOCUMENTS

| 8,531,711 B2* | 9/2013 | Kitagata | G06F 3/1204 358/1.13 |
| 8,860,974 B2* | 10/2014 | Iwatani | G03G 15/00 358/1.14 |
| 8,988,708 B2* | 3/2015 | Kong | G03G 15/5079 358/1.15 |

FOREIGN PATENT DOCUMENTS

JP  2000305883 A  11/2000

* cited by examiner

*Primary Examiner* — Douglas Tran
(74) *Attorney, Agent, or Firm* — Muncy, Geissler, Olds & Lowe, P.C.

(57) ABSTRACT

An image forming system equipped with an image forming apparatus having a plurality of operation modes and an information terminal to be used by a user includes a transmission part that transmits schedule information of the image forming apparatus, and a display part that displays information based on the schedule information.

19 Claims, 7 Drawing Sheets

Fig. 5

| Job ID | Print job data file name |
|---|---|
| 0001 | File0001 |
| 0002 | File0002 |
| 0003 | File0003 |
| ... | ... |

Fig. 6

| Printer ID | Printer name | Status | | Schedule information | Print function information |
|---|---|---|---|---|---|
| | | Operation mode | Consumables residual quantity | | |
| 1 | Multifunction machine 1 | Standby mode | OK | Shifting to standby mode after 10 minutes | Monochrome |
| 2 | Multifunction machine 2 | Power saving mode | OK | | Monochrome |
| 3 | Multifunction machine 3 | Power saving mode | OK | | Monochrome |

Fig. 9

> The transmitted print job cannot be printed.
>
> Printing can be made by changing the setting to monochrome printing and re-transmitting the print job.

Fig. 10

> Printing using the multifunction machine 1 is recommended.
>
> The multifunction machine 1 shifts to the power saving mode after 10 minutes.
>
> It is recommended that printing is performed within 10 minutes.
>
> The job ID is "0001".

Fig. 11

| Printer ID | Printer name | Status | | Schedule information | Print function information |
| --- | --- | --- | --- | --- | --- |
| | | Operation mode | Consumables residual quantity | | |
| 1 | Store A | Standby mode | OK | 7 A.M. to 11 P.M. | Monochrome |
| 2 | Store B | Power saving mode | OK | 24 hours | Monochrome |
| 3 | Store C | Power saving mode | OK | 24 hours | Monochrome |

Fig. 12

Printing on a multifunction machine at the Store A is recommended.

The business hours for Store A are from 7 A.M. to 11 P.M.
It is recommended to perform printing by 11 P.M.

The job ID is 0001

Fig. 13

Printing on a multifunction machine at the Store B is recommended.

Store B is open 24 hours. Printing can be performed at any time.

The job ID is 0001

IMAGE FORMING SYSTEM THAT SENDS SCHEDULE INFORMATION OF IMAGE FORMING APPARATUS OVER NETWORK

CROSS REFERENCE

This present application is related to, claims priority from and incorporates by reference Japanese Patent Application No. 2014-069353, filed on Mar. 28, 2014.

TECHNOLOGY FIELD

The present invention relates to a network system and an image forming method, and more specifically to a network print system capable of making a printer perform printing via a server connected via a network and an image forming method.

BACKGROUND

Conventionally, as a system in which a plurality of computer terminals, a plurality of multifunction machines and a server are connected via a network, there is a system described in Patent Document 1. In the system described in Patent Document 1, it is configured such that image data formed by a computer, etc., is once stored in a server connected via a network and output by a printer at an output destination desired by a user based on an operation of a terminal possessed by a user.

[Patent Document 1]
Japanese Patent Application Laid-open Publication No. 2000-305883

However, in the conventional system, when a user intends to perform an output after selecting an output destination printer, there was a case in which an efficient output destination could not be selected, for example, the destination printer was in a power saving state and took time to be resumed, etc.

Therefore, a network system and an image forming method capable of making a user select an image forming apparatus of a more efficient output destination are desired.

SUMMARY

An image forming system disclosed in the application, which is equipped with an image forming apparatus having a plurality of operation modes and an information terminal to be used by a user includes a transmission part that transmits schedule information of the image forming apparatus, and a display part that displays information based on the schedule information.

Also, the application discloses a network system equipped with a plurality of image forming apparatuses which are operated in any of a plurality of operation modes, a management terminal connected via a network to the image forming apparatuses, and an information terminal to be used by a user. Herein, the image forming apparatus includes an apparatus information transmission unit for transmitting status information of the apparatus to the management terminal, an image forming data request unit for receiving image forming data by requesting to the management terminal depending on an operation of the user, and an image forming unit for performing an image forming process on a medium based on the image forming data received by the image forming data request unit. The management terminal includes management terminal side image forming data receiving unit for receiving the image forming data from the information terminal, an image forming apparatus information receiving units for receiving the status information from each of the image forming apparatuses, a selection unit for selecting the image forming apparatus based on the status information, a notification data producing unit for producing notification data including information of the image forming apparatus selected by the selection unit, and a management terminal side image forming data transmission unit for transmitting the received image forming data depending on a request of the image forming apparatus. The information terminal includes information terminal side image forming data transmission unit for transmitting the image forming data to the management terminal, and a display unit for outputting and displaying information based on the notification data of the management terminal.

According to the present invention, a network system capable of making a user select an image forming apparatus of a more efficient output destination can be provided.

BRIEF DESCRIPTION OF THE DRAWINGS

FIG. 5 is an explanatory diagram showing a structural example of a print job management table according to the first embodiment.

FIG. 6 is an explanatory diagram showing a structural example of a printer management table according to the first embodiment.

FIG. 9 is an explanatory view showing a (first) example of a screen output and displayed on the computer according to the first embodiment.

FIG. 10 is an explanatory view showing a (second) example of a screen output and displayed on the computer according to the first embodiment.

FIG. 11 is an explanatory diagram showing a structural example of a printer management table according to a second embodiment.

FIG. 12 is an explanatory view showing a (first) example of a screen output and displayed on a computer according to the second embodiment.

FIG. 13 is an explanatory view showing a (second) example of a screen output and displayed on the computer according to the second embodiment.

DETAILED DESCRIPTION OF EMBODIMENTS

(A) First Embodiment

Hereinafter, a first embodiment of a network system and an image forming method according to the present invention will be explained in detail with reference to drawings. In this embodiment, an example in which the network system of the present invention is applied to a network print system will be explained.

(A-1) Structure of First Embodiment

Figure 1:
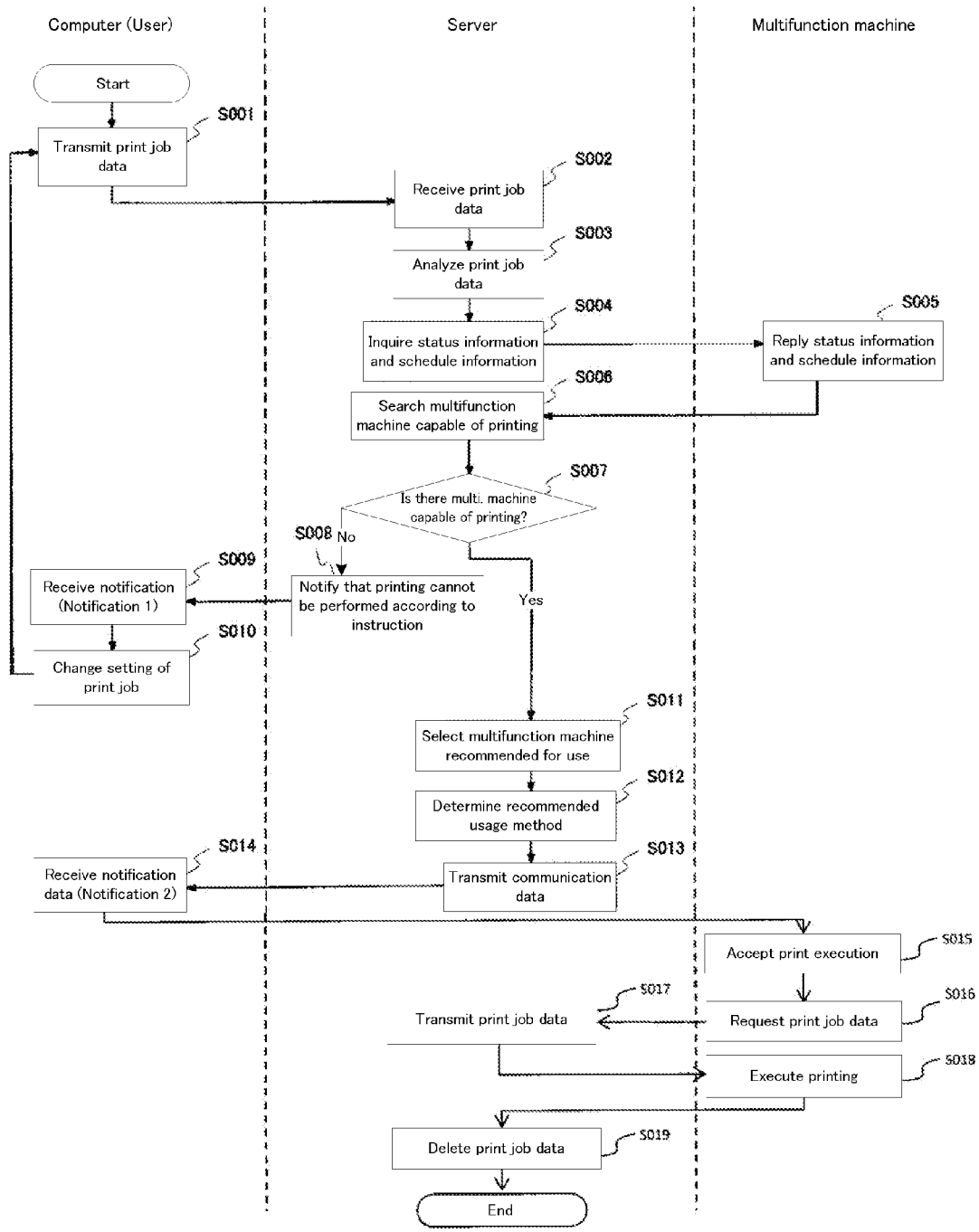
FIG. 1 is a sequence diagram showing an operation of a network system according to a first embodiment.
Figure 2:
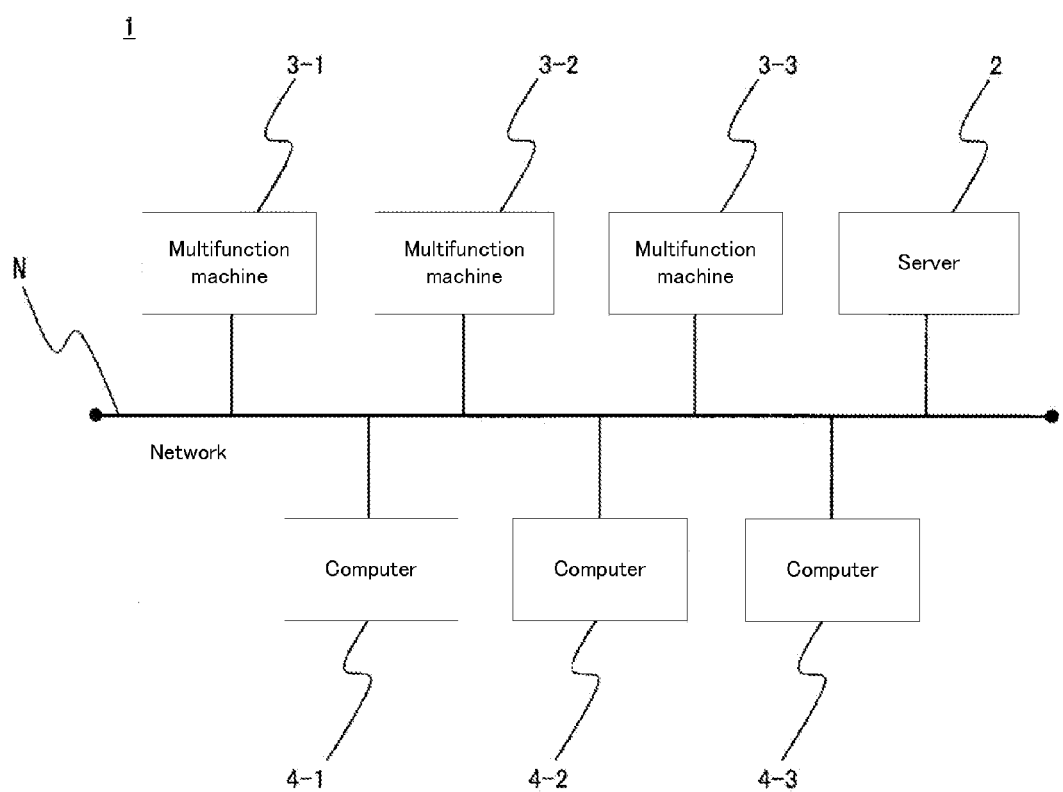
FIG. 2 is a block diagram showing an overall structure of the network system according to the first embodiment.

FIG. 2 is a block diagram showing an overall structure of the network print system 1 of this embodiment.

As shown in FIG. 2, the network print system 1 is constituted by a server 2 as a control apparatus which is a management terminal, multifunction machines 3 as image forming apparatuses, and computers 4 as information terminals. Further, the number of apparatuses arranged in the network print system 1 is not limited. In this embodiment, in the network print system 1, one server 2, three multifunctional machines 3 (3-1 to 3-3), and three computers 4 (4-1 to 4-3) are arranged.

The computer 4 produces data of a print job based on a print image produced by a built-in software and transmits the data to the server 2 according to an operation of a user.

The server 2 stores and analyzes the print job data received from the computer 4 and further transmits the stored print job data based on a request of the multifunction machine 3.

The multifunction machine 3 requests the print job data corresponding to the operation of the user to the server 2 to obtain it and performs print outputting (printing on a print sheet) based on the obtained print job data.

In this embodiment, it is assumed that each apparatus (server 2, multifunction machine 3, computer 4) constituting the network print system 1 is connected to the same network N and is mutually communicable. The network N can have a structure of an IP network such as, e.g., LAN (Local Area Network).

Figure 4:
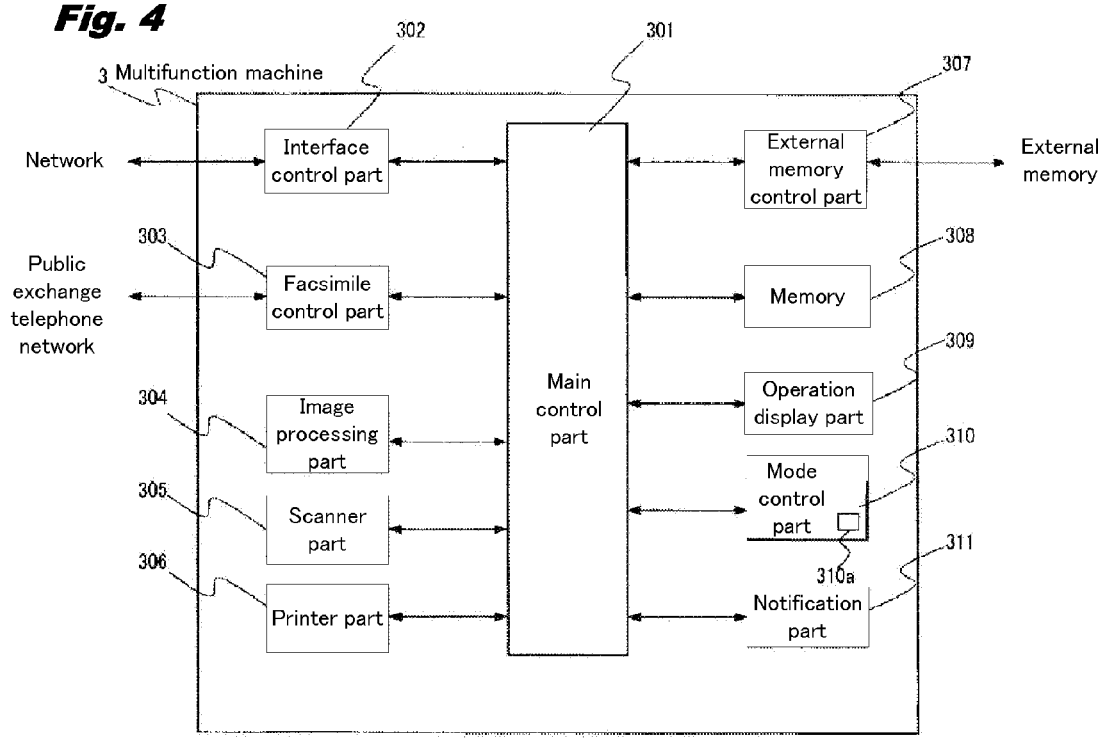
FIG. 4 is a block diagram showing a functional structure of a multifunction machine according to the first embodiment.

FIG. 4 is a block diagram showing an example of the functional structure of the multifunction machine 3 (3-1 to 3-3). Here, the following explanation will be made assuming that all multifunction machines 3 have structures that can be shown by the structural diagram shown in FIG. 4.

The multifunction machine 3 includes a main control part 301, an interface control part 302, a facsimile control part 303, an image processing part 304, a scanner part 305, a printer part 306, an external memory control part 307, a memory 308, an operation display part 309, a mode control part 310, and a notification part 311. The main control part 301 can be constituted by a CPU (Central Processing Unit) as an example.

The main control part 301 controls, based on a control program stored in the memory 308, operations of the interface control part 302, the facsimile control part 303, the image processing part 304, the scanner part 305, the printer part 306, the external memory control part 307, the operation display part 309, and the mode control part 310.

The mode control part 310 determines, based on the time information measured by a built-in timer 310a, the operation mode (standby operation mode) of the apparatus and when there is a shift in operation mode, the content is notified to the main control part 301.

In this embodiment, it is assumed that the multifunction machine 3 (mode control part 310) is capable of waiting in either of operation modes, a standby mode (normal mode) or a power saving mode which waits with less power consumption than in the standby mode (normal mode). Further, the number and the type of operation modes that the multifunction machine 3 (mode control part 310) deals with are not limited. Hereinafter, the operation mode in a state in which each multifunction machine 3 (printer part 306) is in printing operation will be referred to as "operation mode."

Further, the main control part 301 instructs, based on the notification of the mode control part 310, each control part connected to the main control part 301 to shift to the power saving mode and to resume from the power saving mode.

When operating in the standby mode, the multifunction machine 3 (main control part 301) controls the apparatus to become a state in which the print process can be immediately started upon operation request (for example, an event such as receiving print job data, etc.). In a case in which the multifunction machine 3 operates in the standby mode, for example, it is in a state in which power is relatively consumed, such as warming up an unillustrated fuser of the printer part 306.

When operating in the power saving mode, the multifunction machine 3 (main control part 301) controls each control part so as to be operated with less power consumption than in the standby mode (normal mode). For example, when operating in the power saving mode, the multifunction machine 3 (the main control part 301) controls so as to suppress the power consumption by supplying electricity only to structural elements (for example, only the main control part 301, the memory 308, and the interface control part 302) relating to the minimum function to allow operation requests (for example, an event such as receiving print job data) to be received.

Based on the control instruction of the main control part 301, the interface control part 302 performs processes such as data transmission/reception via the network N (for example, receiving print job data from the server 2, transmission/reception of read data and notification data) and storing the data in the memory 308, etc.

The facsimile control part 303 performs facsimile transmission/reception by circuit connection with a public exchange telephone network based on the control instruction of the main control part 301. In detail, the communication data received from the public exchange telephone network is decrypted while being demodulated, and stored in the memory 308 as image data. Furthermore, based on the control instruction of the main control part 301, while encoding the image data stored in the memory 308 to modulate depending on the transmission rate, the communication data is transmitted to the facsimile receiver at the call destination.

The image processing part 304 performs image processing such as enlargement, reduction, rotation, and noise elimination, to the image data stored in the memory 308.

The scanner part 305 reads a manuscript based on the control instruction of the main control part 301 to produce image data and stores the produced image data in the memory 308.

Based on the control instruction of the main control part 301, the printer part 306 receives image data stored in the memory 308, transfers a toner image on a sheet (medium) by an electrographic process, and then performs printing (image forming process) by fusing the toner on the sheet using a heat fuser that is not illustrated.

The external memory control part 307 performs controls, such as detecting an attachment of a removable external memory such as an USB memory, writing image data in the external memory or reading image data from an external memory based on a control instruction of the main control part 301.

The memory 308 is constituted by a ROM part and a RAM part which are not illustrated. In the ROM part, control programs for operating each control part are stored, and in the RAM part, image data to be output by the interface control part 302, the facsimile control part 303, and the scanner part 305 are stored.

The operation display part 309 is provided on a portion of a housing so as to be operable by a user, and can be constituted by, for example, a hard key, a display, etc., which are not illustrated. In the multifunction machine 3, when a user clicks a key arranged on the operation display part 309, the function to be used can be selected, various setting operations can be accepted, and messages showing the status, etc., of the multifunction machine 3 can be displayed on the display screen.

The notification part 311 produces status information including the status of the apparatus (information including the operation mode of the apparatus, residual quantity of the consumables, etc.) and information on the functions that the apparatus deals with (hereinafter referred to as "print function information"), and schedule information showing the future operations of the apparatus, and transmits them to the server 2. Here, the notification part 311 transmits the status information and the schedule information according to an inquiry from the server 2. It can be configured, for example, such that the notification part 311 inquires about each information to the main control part 301 to obtain it. In the main control part 301, it can be configured such that the schedule information and the print function information are registered in advance (registered by a user operation or automatic setting).

In this embodiment, the notification part 311 produces, as schedule information, information such as, a shift time until the apparatus shifts to a power saving mode when the apparatus is being operated in standby mode (for example, a time when user operations and receiving of print job data do not occur), a shift time until the apparatus shifts to a standby mode when the apparatus is being operated in operation mode (for example, if a time in which print job data is not newly received), etc.

The notification part 311 can produce information including items showing the print function information of the apparatus such as a sheet size, a sheet thickness, the number of pages, the number of copies, a print color mode (color or monochrome), a designation of double-sided printing, a print resolution, etc., as print function information, but the following explanation will be made assuming that the print function information of the apparatus is constituted only by the item of the print color mode. That is, in this embodiment, the explanation will be made assuming that the notification part 311 produces either one of values for monochrome showing that the printer part 306 of the apparatus only deals with monochrome printing and for color showing that the printer part 306 of the apparatus deals with color printing as well, as the print function information.

In this embodiment, when the apparatus is in printing operation (the control state of the mode control part 310 is in operation) at the present moment, the notification part 311 replies that the operation mode is in "operation mode," the shift time until the operation mode shifts to the standby mode estimated from the number of print sheets of the print job data, the print function information, and information on the residual quantity of the consumables. Further, when the apparatus is being operated in standby mode, the notification part 311 replies that the operation mode is in "standby mode," the "shift time" until the standby mode shifts to the power saving mode estimated from a timer built in the mode control part 310, the print function information, and the information on the residual quantity of the consumables. Further, when the apparatus is being operated in power saving mode, the notification part 311 replies that the operation mode is in "power saving mode," the print function information, and the information on the residual quantity of the consumables.

Figure 7:
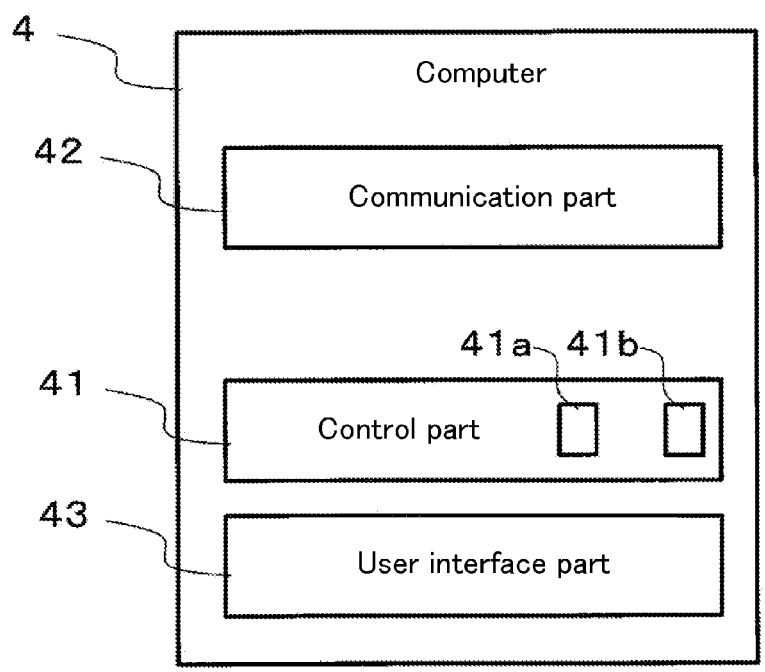
FIG. 7 is an explanatory diagram showing a functional structure of a computer according to the first embodiment.

FIG. 7 is a block diagram showing an example of the functional structure of the computer 4 (4-1 to 4-3). Here, the explanation will be made assuming that all computers 4 have a structure that can be shown by the block diagram as shown in FIG. 7.

As shown in FIG. 7, the computer 4 is equipped with a control part 41 which is constituted by a CPU, a memory, etc., and functions as a program run configuration, a communication part 42 as an interface for connecting to the network N, and a user interface part 43.

Further, here, the control part 41 is equipped with a print job data producing part 41a for producing print job data which becomes a print target as an application and a Web browser 41b as an application to access the server 2.

As the print job data producing part 41a, for example, a combination of various document editing applications and printer drivers etc., can be utilized.

In the computer 4, as an application for accessing the server 2, if the print job data can be uploaded to the server 2 based on a user operation and a message (information) from the server 2 can be displayed and output to the user, it can be configured such that the application can be replaced with something other than a Web browser. For example, in a case in which the computer 4 is a smartphone, a dedicated application operating on a smartphone can be utilized.

A device utilized for the user interface part 43 is not limited, but, for example, a device constituted by a mouse, keyboard, display which are not illustrated, etc., or a device such as a touch panel display which is not illustrated, etc., can be utilized.

Next, the internal structure of the server 2 will be explained.

The server 2 includes a main control part 21, a memory 22, an operation display part 23, an interface control part 24, a high-capacity storage 25, a job analysis part 26, a discrimination part 27, and a notification part 28. The server 2 can be realized by installing a control program to a server computer (for example, a PC or a workstation).

Figure 3:
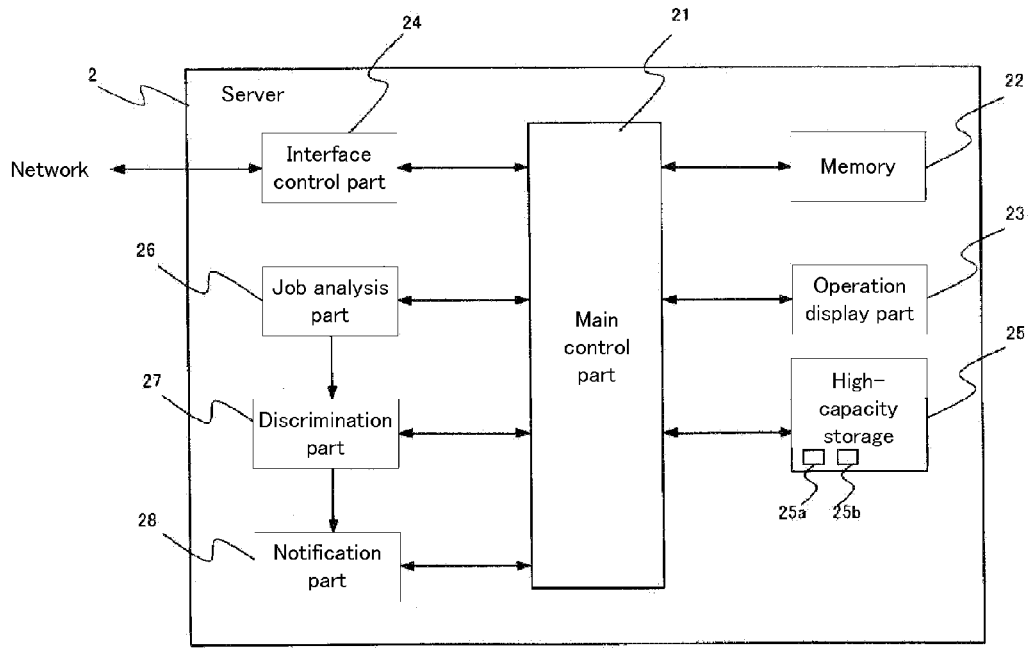
FIG. 3 is a block diagram showing a functional structure of a server according to the first embodiment.

The main control part 21 controls the operations of the operation display part 23, the interface control part 24, the high-capacity storage 25, the job analysis part 26, the discrimination part 27, and the notification part 28 based on the control program stored in the memory 22. The main control part 21 can be constituted by a CPU (central processing unit) as an example. Also, in FIG. 3, the job analysis part 26, the discrimination part 27, and the notification part 28 can be realized as a program (a part of the control program) operating in the main control part 21 (CPU).

The memory 22 stores the control program that the main control part 21 executes.

The operation display part 23 is a user interface of the server 2. It can be configured such that the operation display part 23 is provided on a portion of the housing of the server 2 and when an operator clicks a key that is provided on the operation display part 23, the function to be used can be selected, various setting operations can be performed, and a message showing the status of the server 2, etc., is displayed on the display screen. Further, for example, as the operation display part 23, a display, a keyboard mouse, etc., equipped on the server computer can be utilized.

The interface control part 24 is a communication interface which transmits and receives various data such as print job data, etc., to and from the computer 4 or the multifunction machine 3 connected to the network N, based on the control instruction of the main control part 21 and the requests of the discrimination part 27 and the notification part 28.

The format of the print job data that can be accepted by the server 2 is not limited, but in this embodiment, the following explanation will be made assuming that the print job data is described in PDL (Page Description Language).

The specific structure in which the interface control part 24 accepts the print job data upload from the computer 4 is not limited, but in this embodiment, the following explanation will be made assuming that the interface control part 24 operates as a Web server and the print job data upload is accepted from the computer 4 using a Web screen for uploading the print job data.

Figure 8:
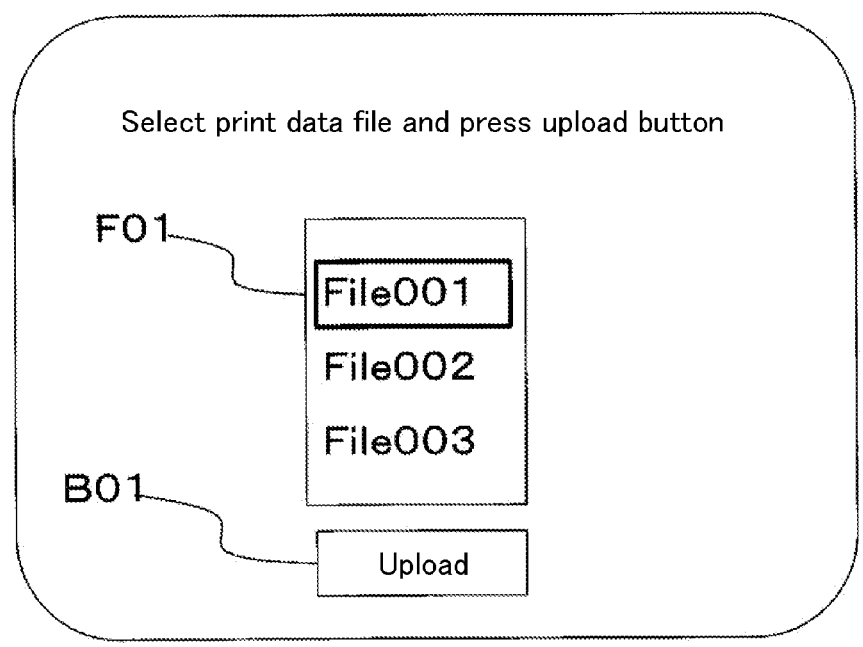
FIG. 8 is an explanatory view showing an operation screen displayed on the computer according to the first embodiment.

FIG. 8 is an example of the Web screen (operation screen) at the time when the server 2 (interface control part 24) receives a print job data upload from the computer 4. In the Web screen shown in FIG. 8, a field F01 for selecting the print job data file and a button B01 for executing the upload of the selected file are provided.

The high-capacity storage 25 is a storage unit for storing print job data or read data received from at least the computer 4 or the multifunction machine 3.

In the high-capacity storage 25, a print job management table 25a for managing the print job data received from the computer 4 and a printer management table 25b for managing the information of each printer (each multifunction machine 3) are stored.

FIG. 5 is an explanatory diagram showing a structural example of the print job management table 25a.

As shown in FIG. 5, in the print job management table 25a, an identifier of each print job (hereinafter referred to as "job ID") and the file of the print job data (the print job data file name in FIG. 5) are managed in an associated manner. In FIG. 5, the job ID of each print job and the print job data file name as the link destination of the print job data are managed in an associated manner. In the high-capacity storage 25, the entity of the print job data is stored as the print job data at its link destination. Further, the management structure of the print job data in the print job management table 25a is not limited to the structure of FIG. 5. For example, the print job data (binary data) can be stored in the print job management table 25a itself.

FIG. 6 is an explanatory diagram showing a structural example of the print job management table 25a.

In the print job management table 25a, for each multifunction machine 3 (each printer), information on items, "printer ID" as an identifier for the system of the multifunction machine 3, "printer name" as a common name (a name which also functions as location information in which at least a user can identify the location), "state," "schedule information," the "print function information," are managed.

The "state" item shows the state of the multifunction machine 3. In this embodiment, the item of the state of the print job management table 25a is constituted by items, for example, operation modes (standby mode, power saving mode, and operation mode) and consumables residual quantity.

The data format of the item of "consumables residual quantity" is not limited, but the explanation will be made assuming that when there are no consumables in which the residual quantity is equal to or less than a predetermined amount in the multifunction machine 3, "OK" is registered, and in a case in which there are consumables in which the residual quantity is equal to or less than the predetermined amount, the name and the consumables residual quantity are registered. For example, in a multifunction machine 3 capable of performing color printing, in a case in which the residual quantity for only the cyan toner is 0%, data such as "cyan toner residual quantity 0%," etc., is registered.

The item of the schedule information shows the schedule information at the time when the status information is obtained from the multifunction machine 3. Further, the main control part 21 updates the contents of the printer management table 25b based on the status information obtained from each multifunction machine 3.

The job analysis part 26 is configured to analyze the print conditions of the received print job data. In this embodiment, the explanation will be made assuming that the job analysis part 26 analyzes only the item of the print color mode about the print job data, but the combination and/or the number of the items of the print conditions subjected to be analyzed are not limited.

The discrimination part 27 selects, based on the control instruction of the main control part 21, the analysis result of the job analysis part 26, and information in the printer management table 25b (status information received from the multifunction machine 3), a multifunction machine 3 capable of printing most efficiently as a network print system 1 among multifunction machines 3 capable of printing print job data as the multifunction machine 3 to be recommended to the user. In this embodiment, the discrimination part 27 selects a multifunction machine 3 capable of printing with the lowest power consumption as the network print system 1 as the multifunction machine to be recommended to the user. Specifically, the discrimination part 27, in a case in which there are a plurality of multifunction machines 3 that are functionally capable of printing the print job data, makes a selection by lowering a priority of the multifunction machines 3 operating in power saving mode. For example, in a case in which there are a multifunction machine 3 operating in standby mode and a multifunction machine 3 operating in power saving mode, when the multifunction machine 3 operating in standby mode is made to perform the printing, the multifunction machine 3 operating in power saving mode is not required to be resumed, which in turn more reduces the power consumption of the network print system 1 as a whole.

Further, the discrimination part 27 discriminates, based on the information in the printer management table 25b (schedule information received from the multifunction machine 3), a usage method to be recommended for the selected multifunction machine 3 (for example, an usage method based on the shift time for the multifunction machine 3 to shift from the standby mode to the power saving mode).

Furthermore, the discrimination part 27 produces notification data to be presented to a user (a user of the computer 4) based on the discrimination result. Specifically, the discrimination part 27 produces a message as notification data for transmitting to a user, the printer name of the multifunction machine 3 to be recommended to a user and a usage method based on the shift time until the multifunction machine shifts to the power saving mode (including the reason). Further, in the discrimination part 27 of this embodiment, a job ID of the print job data is added to the notification data.

The notification part 28 transmits the notification data produced by the discrimination part 27 to the computer 4 (transmits via the interface control part 24), which becomes the transmission source of the print job data.

As described above, in the multifunction machine 3 of the network print system 1 of the first embodiment, the notification part 311, etc., functions as an apparatus information transmission unit. Further, in the multifunction machine 3, the interface control part 302 functions as the image forming data request unit. Furthermore, in the multifunction machine 3, the printer part 306 functions as an image forming unit. Further, in the server 2, the interface control part 24 functions as a control apparatus side image forming data receiving unit, an image forming apparatus information receiving unit, and a control apparatus side image forming data transmission unit. Also, in the server 2, the discrimination part 27 functions as a selection unit, a usage method determination unit, and a notification data producing unit. Further, in the server 2, the notification part 28 functions as a notification data transmission unit. Furthermore, in the computer 4, the print job data producing part 41a and the communication part 42 function as an information terminal side image forming data transmission unit. Further, in the computer 4, the Web browser 41b and the user interface part 43 function as a display unit.

(A-2) Operation of First Embodiment

Next, operations of the network print system 1 of the first embodiment having the aforementioned structure will be explained.

First, it is assumed that in an arbitrary computer 4, print job data based on image data is produced by the print job data producing part 41a and the print job data is transmitted to the server 2 (S001). In this embodiment, as an example, the Web browser 41b of the computer 4 accesses (accesses based on a user operation) the server 2 (interface control part 24) operating as a Web server to thereby perform uploading.

In the server 2 (interface control part 24), the received print job data is stored in the high-capacity storage 25 (S002). Then, a job ID is allotted to the obtained print job data by the interface control part 24 and information relating to the print job data is additionally registered in the print job management table 25a.

Then, in the server 2 (job analysis part 26), the conditions for printing the print job data stored in the high-capacity storage 25 (information for selecting the multifunction machine 3) is analyzed (S003). As described above, in this embodiment, the explanation will be made assuming that, as a condition that the job analysis part 26 analyzes, only the print color mode (color or monochrome) is analyzed.

Next, the discrimination part 27 of the server 2 inquires each multifunction machine 3 about the status information and the schedule information (S004).

Then, each multifunction machine 3 returns status information and schedule information in response to the request received from the server 2 (S005).

Next, the server 2 (discrimination part 27) discriminates, using the analysis result of the job analysis part 26 and the print function information included in the status information received form a multifunction machine 3, whether there is a multifunction machine capable of printing among the multifunction machines 3 connected to the network N (S006, S007).

In this embodiment, the print color mode is confirmed (for example, confirmed by analyzing the header portion of the print job data) for the print jobs obtained by the job analysis part 26. Then, the discrimination part 27 searches for the existence of a multifunction machine 3 corresponding to the confirmed print color mode, and when a corresponding multifunction machine 3 is detected, the operation is started at Step S011 which will be explained later. When such a machine is not detected, the operation is started at Step S008 which will be explained later.

In a case in which a corresponding multifunction machine 3 could not be detected in the aforementioned step S007, the server 2 (notification part 28) returns (returns via the interface control part 24) the fact that a multifunction machine 3 capable of printing the print job data according to the instruction does not exist, the reasons, a guide for changing print conditions, etc., to the computer 4 at the transmission destination of the print job data (S008). The details of contents of the reply of the notification part 28 in step S008 will be described later.

After receiving the notification data, the computer 4 outputs the contents of the notification data to the user interface part 43 (for example, a display which is not illustrated) to present it to the user (S009). Then, a user who received the presentation of the message performs an operation on the computer 4 for producing the print job data in which the print conditions are changed in consideration of the message (S010), which makes it possible to transmit the print job data again (that is, the network print system 1 starts the operation again from the aforementioned step S001).

For example, when the computer 4 transmits print job data instructing color printing and no multifunction machine 3 handling color printing exists in the network print system 1, it is preferable that the notification part 28 transmit a message as shown in FIG. 9 to the computer 4 to output the message to the user. As shown in FIG. 9, by displaying a message saying "the transmitted print job cannot be printed. Printing can be made by changing the setting to monochrome printing and re-transmitting the print job," a user can understand that printing can be made by producing print job data instructing monochrome printing and transmitting the print job data again.

As a result of the judgment of the aforementioned step S007, in a case in which a multifunction machine 3 functionally capable of printing the obtained print job data is detected, the discrimination part 27 selects a multifunction machine 3 capable of printing most efficiently (S011) by referring to (referring to the information of the printer management table 25b) the state (operation mode) of the detected multifunction machine 3, and further determines a usage method to be recommended based on the schedule information (S012) to produce notification data. Then, the notification part 311 returns data including the notification data produced by the discrimination part 27 to the computer 4 which is the transmission source of the print job data (S013).

After receiving the notification data, the computer 4 outputs the contents of the notification data to the user interface part 43 (for example, a display which is not illustrated) and presents it to the user (S009).

For example, it is assumed that the print job data obtained by the server 2 is functionally capable of printing by the multifunction machines 3-1 to 3-3. Further, it is assumed that the multifunction machine 3-1 operates in standby mode (10 minutes until shifting to the power saving mode) and the multifunction machines 3-2 and 3-3 operate in power saving mode. In this case, the discrimination part 27 selects the multifunction machine 3-1 in standby mode as a multifunction machine 3 to be recommended to a user. Further, in a case in which "shifting to the standby mode after 10 minutes" is registered in the printer management table 25b as the schedule information of the multifunction machine 3-1, and the job ID of the print job data is "0001," the discrimination part 27 produces a message saying, for example, "Printing by the multifunction machine 1 is recommended. The multifunction machine 1 shifts to a power saving mode after 10 minutes. It is recommended that the printing is performed within 10 minutes. The job ID is 0001". As notification data (message) to be produced by the discrimination part 27, for example, character strings (fixed format for messages) in which only the elements that change according to the print job data such as the printer name, the shift time, the job ID, etc., as variables may be registered in advance to be produced each time as necessary. In this case, the contents displayed on the user interface part 43 (display) of the computer 4 is as shown in FIG. 10. With this, the user can understand that the recommended printer is the multifunction machine 3-1 (printer name: multifunction machine 1) and since it shifts to a power saving mode after 10 minutes, it would be efficient to perform the printing on the multifunction machine 3-1 within 10 minutes (recommended limit for printing). In addition, in this embodiment, when a user grasps the printer name as described above, the location of the corresponding multifunction machine 3 can be found and accessed. Further, from the message, a user can find out that the job ID is "0001."

Then, it is assumed that the user operates the multifunction machine 3 recommended by the message from the server 2 (with the job ID entered) (S015). That is, the multifunction machine 3 ultimately selected by a user can accept a print instruction (entering job ID) from a user by way of the operation display part 23 (for example, ten key, etc., which is not illustrated).

Next, the multifunction machine 3 which accepted the print instruction requests the print job data of the job ID to the server 2 (S016), and the server 2 obtains the print job data corresponding to the request (reads from the high-capacity storage 25) and transmits it to the multifunction machine 3 (S017).

Then, the multifunction machine 3 which received a response for the print job data performs printing (printing by the printer part 30$b$) according to the print job data and notifies the server 2 of the completion of printing (S018).

Then, in the server 2 which received a notification of completion of printing, the print job data for which printing was finished is deleted (also deletes the accompanying data of the print job management table 25$a$) (S019) and the process is terminated.

(A-3) Effects of First Embodiment

According to the first embodiment, the following effects can be exerted.

The server 2 manages the status information of each multifunction machine 3, selects a multifunction machine 3 among the entire network print system 1 that is capable of printing most efficiently (printing with the least power consumption), transmits the information of the selected multifunction machine 3 (for example, printer name) to the computer 4 as notification data and presents it to a user. In the conventional network print system, it was difficult for a user to easily discriminate which multifunction machine would consume the least amount of power at that moment, which leads to execution of an unnecessary resuming process, but in the network print system 1 of the first embodiment, an unnecessary resuming process can be restrained. Further, in the network print system 1, since it is possible for a user to find a multifunction machine 3 that does not require a resuming process from the power saving mode, the print processing can be performed early.

Further, the server 2 manages the schedule information of each multifunction machine 3 and transmits the usage method to be recommended for the selected multifunction machine 3 (for example, that printing should be performed before the shift to the power saving mode and the shift time to the power saving mode) to the computer 4 as notification data, to be presented to the user. With this, since a user can execute the printing before the recommended multifunction machine 3 shifts to the power saving mode, more efficient printing can be performed (printing with the least power consumption).

(B) Second Embodiment

Hereinafter, a second embodiment of the network system and the image forming method according to the present invention will be explained in detail with reference to drawings. In this embodiment, an example in which the network system of the present invention is utilized as a network print system will be explained.

In the first embodiment, as the schedule information of each multifunction machine 3 managed by the server 2, the shift time until the standby mode shifts to the power saving mode was applied, but other than that, the operation schedule (operation plan) of each multifunction machine 3 may be applied.

Here, as an example, the following explanation will be made by assuming that each multifunction machine 3 is located at a store such as a convenience store, etc. In this case, the printer management table 25$b$ managed by the server 2 is shown in, for example, FIG. 11. In FIG. 11, the store name of each store is utilized as the printer name. In FIG. 11, the printer names of the multifunction machines 3-1 to 3-3 are illustrated as Store A, Store B, and Store C corresponding to each store name. In addition, here, it is assumed that a user can locate the store by looking at the store name.

Also, in this embodiment, as shown in FIG. 11, it is assumed that the business hours of each store (that is, the operation schedule of the multifunction machine 3) are registered as the schedule information. For example, in FIG. 11, since the schedule information is "7 A.M. to 11 P.M." for the multifunction machine 3-1 at the Store A, it can be understood by the server 2 (discrimination part 27) that it is necessary to convey that printing using the multifunction machine 3-1 must be performed by 11 P.M. to a user as a recommended usage method (recommended limit for printing). On the other hand, in FIG. 11, since the schedule information is "24 hours" for the multifunction machine 3-2 at the Store B, the store is not scheduled to close and therefore, printing can be performed at any time.

For example, in a case in which the discrimination part 27 selects the multifunction machine 3-1 as a recommended multifunction machine 3, the contents of the notification data to be produced may be the message as shown in FIG. 12 ("Printing on a multifunction machine at the Store A is recommended. The business hours for the Store A are from 7 A.M. to 11 P.M. It is recommended to perform printing by 11 P.M. The job ID is 0001").

Further, for example, in a case in which the discrimination part 27 selects the multifunction machine 3-2 as the recommended multifunction machine 3, the contents of the notification data to be produced may be the message as shown in FIG. 13 ("Printing on a multifunction machine at the Store B is recommended. The Store B is open for 24 hours. Printing can be performed at any time. The job ID is 0001").

Furthermore, in the first embodiment, in the aforementioned step S011, the discrimination part 27 selected a multifunction machine 3 capable of reducing the power consumption most as the multifunction machine 3 to be recommended to a user, but the discrimination part 27 of the second embodiment may select a multifunction machine 3 of a store that is closest to the location of the user (the location of the computer 4 of the transmission source of the print job data). The method that the discrimination part 27 obtains the location information of the computer 4 and each of the multifunction machines 3 is not limited, and various structures for obtaining location information may be applied. For example, the server 2 (interface control part 24) may obtain the location information from the computer 4 (for example, the location information obtained from an unillustrated built-in GPS apparatus, etc., of the computer 4). Further, for example, the location information (address, coordinates, etc.) of each store (each multifunction machine) may be registered in advance in the server 2 (high-capacity storage 25). Furthermore, for example, the location information of the apparatus may be registered in each multifunction machine 3 and the server 2 (interface control part 24) may obtain them from each multifunction machine 3 as a part of the status information.

As described above, in the second embodiment, as the notification data to be presented to the user, a recommended usage method based on the operation schedule of the multifunction machine 3 (the business hours of the stores where they are located) may be presented. With this, in the second embodiment, since a case in which a user visits a store where the recommended multifunction machine 3 is located after the store closes and therefore travel to a multifunction machine 3 at another store can be prevented, which enables efficient printing (highly convenient printing) for the user.

In this embodiment, the transmission part 311 (or notification part) transmitted the time until shifting to the power saving mode as schedule information of the apparatus (a multifunction machine 3 as an image forming apparatus) via the server 2 to the computer 4 as an information terminal, and the information based on the schedule information was displayed on the user interface part 43. However, the functions corresponding to the interface part 43 can be displayed on the operation display part 309 to make it possible for the schedule information of the apparatus to be confirmed by the operation display part 309 of the apparatus.

(C) Other Embodiments

The present invention is not limited to the aforementioned embodiments and variable embodiments as exemplified below may be exemplified.

(C-1) In the aforementioned embodiments, all printers constituting the network print system 1 were explained to be multifunction machines, but it should be understood that a part or all of them may be replaced with printers (network printers) having no facsimile and/or copy function.

What is claimed is:

1. An image forming system, comprising:
   an image forming apparatus that forms an image on a medium;
   an information terminal operated by a user and connected to the image forming apparatus via a network; wherein
   the image forming apparatus includes a notification part that produces schedule information of the image forming apparatus; and
   at least one of the image forming apparatus and the information terminal includes a display part that displays information contained in the schedule information that is produced by the notification part.

2. The image forming system according to claim 1, wherein the image forming apparatus has a plurality of operation modes including
   a first operation mode which is operated with predetermined power consumption and
   a second operation mode which is operated lower in power consumption than the predetermined power consumption of the first operation mode, and
   the information contained in the schedule information indicates that the operation mode of the image forming apparatus shifts from the first operation mode to the second operation mode.

3. The image forming system according to claim 1, wherein the image forming apparatus is equipped with a transmission part that transmits the schedule information produced by the notification part to the information terminal, and
   the information terminal is equipped with the display part.

4. The image forming system according to claim 1, further comprising
   a management terminal that is connected via the network to the image forming apparatus and the information terminal, wherein
   the image forming apparatus transmits the schedule information produced by the notification part,
   the management terminal includes a notification data producing part that sends a notification data to the information terminal of the information included in the schedule information produced by the notification part,
   the information terminal includes the display part, and
   the display part displays information contained in the notification data that is sent from the notification data producing part.

5. The image forming system according to claim 1, wherein the image forming apparatus comprises a plurality of image forming apparatuses,
   the display part displays a recommended image forming apparatus among the plurality of image forming apparatuses.

6. The image forming system according to claim 5, wherein if the plurality of image forming apparatuses include a first image forming apparatus that stands by in a first operation mode which is operated with predetermined power consumption and a second image forming apparatus that is in a second operation mode which is operated lower in power consumption than the predetermined power consumption of the first operation mode, the display part displays the first image forming apparatus in the first operation mode as the recommended image forming apparatus.

7. The image forming system according to claim 5, wherein the display part displays an image forming apparatus that is located at a position closest to the information terminal as the recommended image forming apparatus.

8. The image forming system according to claim 1, wherein the schedule information includes time for the image forming apparatus to switch from a first operation mode which is operated with predetermined power consumption to a second operation mode which is operated lower in power consumption than the predetermined power consumption of the first operation mode.

9. The image forming system according to claim 1, wherein the schedule information includes time during which the image forming apparatus is available for image formation.

10. The image forming system according to claim 1, wherein
    the schedule information includes business hours of a store at which the image forming apparatus is located.

11. The image forming system according to claim 4, wherein
    the image forming apparatus comprises a plurality of image forming apparatuses,
    the information terminal transmits image formation data to the management terminal, and
    the notification part that notifies an image forming apparatus that is available for forming an image based on the image formation data among the plurality of image forming apparatus.

12. A network system, comprising:
    a plurality of image forming apparatuses which are operated in any of a plurality of operation modes;
    an information terminal operated by a user; and
    a management terminal connected via a network to the plurality of image forming apparatuses and the information terminal, wherein
    each of the plurality of image forming apparatuses comprises:

an apparatus information transmission unit for transmitting status information of the iamge forming apparatus to the management terminal;

an image forming data request unit for receiving image forming data from the management terminal, the image forming data transmitted from the information termainl to the management terminal base on an operation by the user; and an image forming unit for performing an image forming process on a medium based on the image forming data received by the image forming data request unit, the management terminal comprises:

a management terminal side image forming data receiving unit for receiving the image forming data from the information terminal;

an image forming apparatus information receiving unit for receiving the status information from each of the plurality of image forming apparatuses;

a selection unit for selecting an image forming apparatus from the plurality of image forming apparatus based on the status information;

a notification data producing unit for producing notification data including information of the image forming apparatus selected by the selection unit; and a management terminal side image forming data transmission unit for transmitting the received image forming data to the selected image forming apparatus in accordance with a request by the selected image forming apparatus, and the information terminal comprises:

an information terminal side image forming data transmission unit for transmitting the image forming data to the management terminal; and a display unit for outputting and displaying information included in the notification data received from the management terminal.

13. The network system according to claim 12, wherein the status information includes operation mode information indicating an operation mode.

14. The network system according to claim 12, wherein the selection unit selects the image forming apparatus capable of performing efficient image forming based on the status information when the image forming is performed on the received image forming data.

15. The network system according to claim 12, wherein the management terminal includes a notification data transmission unit for transmitting the notification data produced by the notification data producing unit to the information terminal.

16. The network system according to claim 13, wherein the selection unit lowers a priority order to be selected of the image forming apparatus operated in a power saving mode in which the image forming apparatus is operated with less power consumption than in normal.

17. The network system according to claim 13, wherein the apparatus information transmission unit further transmits schedule information indicating a scheduled operation of the image forming apparatus to the management terminal, the image forming apparatus information receiving unit receives the status information and the schedule information from each of the plurality of image forming apparatuses, the management terminal further comprises a usage method determination unit for determining an usage method to be recommended for the image forming apparatus selected by the selection unit based on the received schedule information, and the notification data producing unit produces notification data including information of the image forming apparatus selected by the selection unit and information of the usage method determined by the usage method determination unit.

18. The network system according to claim 17, wherein the schedule information includes information of a shift time that is until an operation mode of the image forming apparatus shifts, and the usage method determination unit determines a time limit of image formation based on the shift time included in the schedule information as a recommended usage method.

19. The network system according to claim 17, wherein the schedule information includes information of an operation schedule of the image forming apparatus, and the usage method determination unit determines a time limit of image formation based on the operation schedule information included in the schedule information as a recommended usage method.

* * * * *